United States Patent Office 3,098,088
Patented July 16, 1963

3,098,088
PRODUCTION OF HALOALKYLTIN(IV) HALIDES
Rudolf Polster, Heidelberg, Germany, assignor to Badische Anilin- & Soda-Fabrik Aktiengesellschaft, Ludwigshafen (Rhine), Germany
No Drawing. Filed Oct. 3, 1961, Ser. No. 142,517
Claims priority, application Germany Oct. 5, 1960
9 Claims. (Cl. 260—429.7)

This invention relates to a process for the production of haloalkyltin(IV) halides. It further relates to the new haloalkyltin(IV) halides themselves and to new intermediates for their preparation.

Organotin compounds which contain functional groups in the organic radicals have hitherto not been very well known. Such compounds may be prepared, for example, by reacting alkyltin hydrides with α-olefines which bear functional groups. This process is not suitable, however, for the production of haloalkyltin compounds. For example, triphenyltin bromide and propylene are obtained from triphenyltin hydride and allyl bromide, and not the expected triphenylbromopropyltin.

It is an object of this invention to provide new haloalkyltin(IV) halides. Another object of the invention is a process for the production of these substances. A further object of the invention is to provide new intermediates for the production of haloalkyltin(IV) halides. A still further object of the invention is a process for the production of the said intermediates. Other objects of the invention will become evident from the following detailed description.

In accordance with this invention it has now been found that the said objects are achieved by reacting an organoaluminum compound which has been obtained by reaction of a diolefine of the general formula:

$$CH_2=CH-\underset{\underset{R_1}{|}}{\overset{\overset{CH_3}{|}}{C}}-CH=CH_2$$

in which $R_1$ denotes a $C_1$–$C_4$ alkyl radical, with an organoaluminum compound of the general formula:

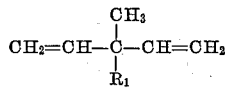

in which y denotes a $C_2$–$C_4$ alkyl radical and $y_1$ a $C_2$–$C_4$ alkyl radical or a hydrogen atom, with a tin tetrahalide. On the spirocyclic tin alkylene compounds having the general formula:

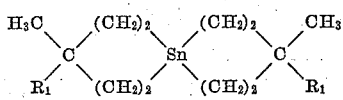

in which $R_1$ denotes a $C_1$–$C_4$ alkyl radical, thus obtained in the first stage, halogen is allowed to act in the second stage.

The new compounds which are obtained in this second stage have the general formula:

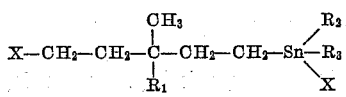

In this formula, $R_1$ has the meaning given above while X stands for halogen. $R_2$ denotes the grouping:

$$-CH_2-CH_2-\underset{\underset{R_1}{|}}{\overset{\overset{CH_3}{|}}{C}}-CH_2-CH_2-X$$

$R_3$ denotes halogen and $R_2$ and $R_3$ taken together denote:

$$-CH_2-CH_2-\underset{\underset{R_1}{|}}{\overset{\overset{CH_3}{|}}{C}}-CH_2-CH_2-$$

The organoaluminum compounds may be those obtainable according to application Ser. No. 141,993, filed October 2, 1962, by Rudolf Polster and Herbert Friederich. In this copending application, there is disclosed the reaction of a diolefine of the formula $$CH_2=CH-\underset{\underset{R_1}{|}}{\overset{\overset{CH_3}{|}}{C}}-CH=CH_2$$

wherein $R_1$ represents an alkyl radical of 1 to 4 carbon atoms with an aluminum compound of the formula

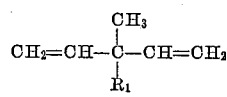

wherein y represents an alkyl radical of 2 to 4 carbon atoms and $y_1$ represents hydrogen or an alkyl of 2 to 4 carbon atoms in a molar ratio of 0.5 to 4.0 moles of the diolefine per mole of the aluminum compound and at a temperature of from 20 to 160° C.

Tin tetrachloride and tin tetrabromide are best suited of the tin tetrahalides for the reaction with the organoaluminum compounds.

It is preferable to react such amounts of organoaluminum compound and tin tetrahalide that the ratio of Al to Sn is 1.5 to 3:1.

The reaction of the organoaluminum compounds with tin tetrahalides may be carried out at temperatures between 0° and 160° C., preferably at temperatures between 20° and 80° C. Aromatic hydrocarbons, such as benzene, toluene or xylene may be added as diluents. To complete the reaction it is advantageous to add compounds which are capable of forming complexes with aluminum chloride, for example ethers, tertiary amines or alkali halides, and preferably diethyl ether.

It is advantageous to use 0.8 to 2 moles of the complex forming substance per gram atom of the aluminum contained in the organoaluminum compound.

The new spirocyclic tin alkylene compounds obtained are preferably distilled off in vacuum. They contain halogen only in traces and this can be removed by shaking with aqueous potassium fluoride solution. If diethyl ether is used as the complex forming substance, aluminum chloride etherate can be distilled off together with the spirocyclic tin alkylene compound. At temperatures between −70° C. and +30° C., two phases form so that the spirocyclic tin alkylene compound can be separated in a simple way from the aluminum chloride etherate almost quantitatively.

Bis-(3,3-dimethyl-pentamethylene) tin and bis-(3-methyl-3-ethyl-pentamethylene) tin are examples of the new spirocyclic tin alkylene compounds.

Chlorine, bromine or iodine is especially suitable for reaction with the new spirocyclic tin alkylene compounds. The reaction of the new tin alkylene compounds with halogen may be carried out, for example, by charging the initial material to a stirring vessel, heating it to a temperature between about −70° C. and +100° C., preferably between −10° C. and +20° C. and then adding the halogen gradually in gaseous, liquid or dissolved form. The reaction may also be carried out in the presence of an inert solvent. This can be added to the initial material and or added with the halogen. The halogen may also be introduced into the reaction vessel by means of a carrier gas. Suitable solvents include chloroform, carbon tetrachloride or ethyl acetate. Nitrogen, carbon dioxide or argon is suitable, among others, as the carrier gas. The low boiling fraction is distilled off from the reaction mixture under reduced pressure. The remaining halogenalkyltin halides can often be used without further purification. If desired, they can be further purified by fractional distillation in many cases. If the spirocyclic tin alkylene compounds are reacted with the halogen in the mole ratio 1:1, compounds of the general formula:

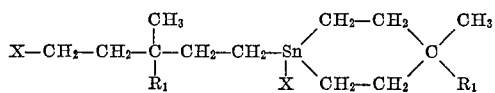

are obtained in high yields.

Compounds of the general formula:

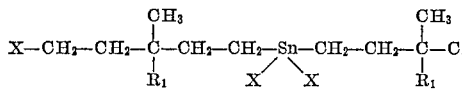

are obtained when the spirocyclic tin alkylene compounds and the halogen are reacted in the mole ratio 1:2.

The halogenalkyltin(IV) halides of the invention are useful fungicidal substances. They may be used with the usual diluents, such as talc.

The invention is illustrated by, but not limited to, the following examples. The parts are parts by weight.

*Example 1*

47 parts of di-isobutyl aluminum hydride is heated slowly to 160° C. with 32 parts of 3,3-dimethylpentadiene-(1,4). Then all volatile constituents are distilled of in vacuo. The residue is 32 parts of an organoaluminum compound in the form of a viscous resin which is completely dissolved in 100 parts of benzene.

27 parts of tin tetrachloride and 9.5 parts of ether are dripped into this solution at 40° to 60° C. and the whole is heated under reflux for another hour. The benzene is withdrawn and then all volatile constituents distilled off in vacuo at a pressure of $10^{-4}$ mm. Hg up to a bath temperature of 160° C. The colorless distillate, at first cloudy, usually separates even at room temperature or slightly below into two clear phases. The lower phase is separated, 35 parts of ether added and shaken up first with hydrochloric acid and then with 10% aqueous potassium fluoride solution, then filtered and distilled.

20 parts of bis-(3,3-dimethylpentamethylene) tin of the boiling point 78° to 81° C. at $10^{-4}$ mm. Hg refractive index $n_D^{20}=1.5176$ is obtained.

*Analysis.*—$C_{14}H_{28}Sn$:
 Calculated: C, 53.37; H, 8.96; Sn, 37.67. Molecular weight, 315.1.

Found: C, 53.37; H, 8.96; Sn, 37.3. Molecular weight, 311.0.

*Example 2*

28.3 parts of bis-(3,3-dimethyl-pentamethylene) tin is dissolved in 200 parts of ethyl acetate and cooled to 10° C. Within 3 hours, a solution of 14.4 parts of bromine in 135 parts of ethyl acetate is added to the organotin compound, the temperature being kept at +10° C. by cooling. When the addition of bromine has been completed, the solvent is distilled off and the residue fractionated under reduced pressure. 34 parts, equivalent to 80% of the theory, of 3,3-dimethylpentamethylene-(5′-brom-3′,3′-dimethylpentyl) tin bromide is obtained as a colorless oil of the boiling point 141° to 145° C. at $10^{-4}$ mm. Hg and with the refractive index $n_D^{20}=1.5528$.

*Analysis.*—$C_{14}H_{28}SnBr_2$; molecular weight, 474.95:
 Calculated: C, 35.41; H, 5.94; Br, 33.65; Sn, 24.99.
 Found: C, 35.4; H, 6.0; Br, 33.4.

*Example 3*

A solution of 28.8 parts of bromine in 270 parts of ethyl acetate is added at 0° C. within four hours to a solution of 28.3 parts of bis-(3,3-dimethylpentamethylene) tin in 200 parts of ethyl acetate. The mixture is heated with an addition of some animal charcoal and the colorless filtrate freed from solvent under reduced pressure at room temperature. 45 parts of bis-(5-brom-3,3-dimethylpentyl) tin dibromide are obtained as residue as an almost colorless oil with the refractive index $n_D^{20}=1.5610$. The yield is 79% of the theory.

*Analysis.*—$C_{14}H_{28}SnBr_4$; Molecular weight, 634.78:
 Calculated: C, 26.49; H, 4.45; Br, 50.36; Sn, 18.70.
 Found: C, 27.0; H, 4.5; Br, 50.4.

*Example 4*

9.4 parts of bis-(3,3-dimethylpentamethylene) tin is dissolved in 65 parts of chloroform. A solution of 7.6 parts of iodine in 540 parts of chloroform is added to the solution within two hours, the temperature being kept at 0° C. The reaction mixture is heated with some animal charcoal and the colorless filtrate freed from solvent at room temperature under reduced pressure. 15 parts of 3,3-dimethylpentamethylene - (5′ - iodo - 3′,3′ - dimethylpentyl) tin iodide with the refractive index $n_D^{20}=1.5935$ remain as residue. The yield is 88% of the theory.

*Analysis.*—$C_{14}H_{28}SnI_2$; molecular weight, 568.94:
 Calculated: C, 29.56; H, 4.96; I, 44.61; Sn, 20.86.
 Found: C, 29.9; H, 5.1; I, 45.2.

*Example 5*

20 parts of bis-(3,3-dimethylpentamethylene) tin is dissolved in 35 parts of chloroform. A solution of 4.65 parts of chlorine in 130 parts of chloroform is added within two hours, the temperature being kept at 0° C. The solvent is distilled off and the residue fractionated under reduced pressure.

18 parts, i.e. 73% of the theory, of 3,3-dimethylpentamethylene-(5′-chloro-3′,3′-dimethylpentyl) tin chloride of the boiling point 98° to 103° C./$10^{-4}$ mm. Hg is obtained which solidifies in the receiver to colorless crystals of the melting point 51° to 53° C.

*Analysis.*—$C_{14}H_{28}SnCl_2$; molecular weight, 385.98:
 Calculated: C, 43.56; H, 7.31; Cl, 18.37; Sn, 30.75.
 Found: C, 43.8; H, 7.5; Cl, 18.1.

*Example 6*

Finely ground mixtures of talc, in each case with 10% by weight of the haloalkyltin(IV) halides set out in the following table are dusted onto the surface of nutrient agar with an addition of fungus spores (*Aspergillus niger*), 17 mg. of each haloalkyltin(IV) halide/talc/spore mixture being dusted onto each square cm. of the surface of the agar. The infected agar is kept for five days at 35° C.

and then the growth of fungus determined. The results of these tests are given in the following table:

| Active substance | Result |
|---|---|
| 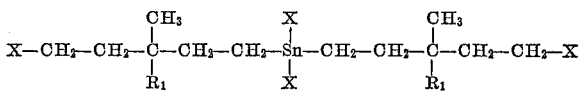 | no fungus growth. |
| 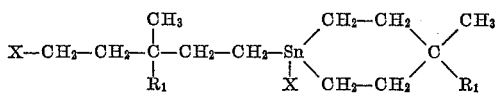 | Do. |
| 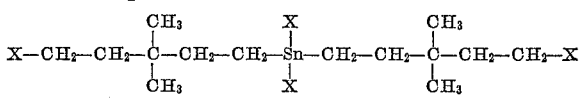 | Do. |
| None | strong fungus growth. |

I claim:
1. A compound selected from the class consisting of:

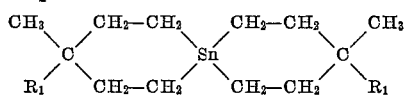

and

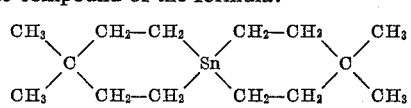

in which $R_1$ is a $C_1$ to $C_4$ alkyl radical and X is halogen.

2. A compound of the formula

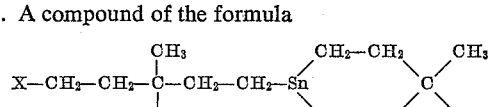

wherein X is halogen.

3. A compound of the formula:

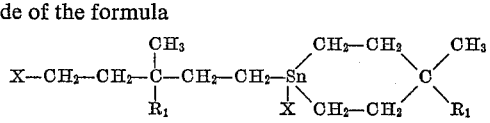

in which $R_1$ is a $C_1$ to $C_4$ alkyl radical.

4. The compound of the formula:

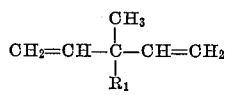

5. A compound of the formula

wherein X is halogen.

6. A process for the production of a haloalkyltin(IV) halide of the formula

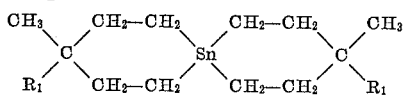

wherein $R_1$ is a $C_1$ to $C_4$ alkyl radical and X is halogen, which process comprises: (a) reacting in a first stage a tin tetrahalide selected from the group consisting of tin tetrachloride and tin tetrabromide with an organo aluminum compound in a ratio of Al to Sn of about 1.5:1 to 3:1, said organo aluminum compound being obtained by reaction of a diolefine of the formula $$CH_2=CH-\underset{\underset{R_1}{|}}{\overset{\overset{CH_3}{|}}{C}}-CH=CH_2$$

wherein $R_1$ represents an alkyl radical of 1 to 4 carbon atoms with an aluminum compound of the formula $$Al\begin{matrix}{-y}\\{-y}\\{-y_1}\end{matrix}$$

wherein y represents an alkyl radical of 2 to 4 carbon atoms and $y_1$ represents a member selected from the group consisting of hydrogen and an alkyl radical of 1 to 4 carbon atoms in a ratio of 0.5 to 4 moles of said diolefine to one mole of said aluminum compound and at a temperature of from 20° C. to 160° C.; and (b) reacting the resulting spirocyclic tin alkylene compound obtained according to said first stage with halogen in a molar ratio of about 1:1.

7. A process for the production of haloalkyltin(IV) halides which comprises the reaction of a spirocyclic tin alkylene compound of the formula:

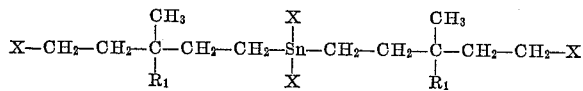

in which $R_1$ is a $C_1$ to $C_4$ alkyl radical with a halogen.

8. A process for the production of a haloalkyltin(IV) halide of the formula

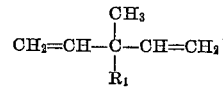

wherein $R_1$ is a $C_1$ to $C_4$ alkyl radical and X is halogen, which process comprises: (a) reacting in a first stage a tin tetrahalide selected from the group consisting of tin tetrachloride and tin tetrabromide with an organo aluminum compound in a ratio of Al to Sn of about 1.5:1 to 3:1, said organo aluminum compound being obtained by reaction of a diolefine of the formula $$CH_2=CH-\underset{\underset{R_1}{|}}{\overset{\overset{CH_3}{|}}{C}}-CH=CH_2$$

wherein $R_1$ represents an alkyl radical of 1 to 4 carbon atoms with an aluminum compound of the formula

wherein $y$ represents an alkyl radical of 2 to 4 carbon atoms and $y_1$ represents a member selected from the group consisting of hydrogen and an alkyl radical of 1 to 4 carbon atoms in a ratio of 0.5 to 4 moles of said diolefine to one mole of said aluminum compound and at a temperature of from 20° C. to 160° C.; and (b) reacting the resulting spirocyclic tin alkylene compound obtained according to said first stage with halogen in a molar ratio of about 1:2.

9. A process for the production of a spirocyclic tin alkylene compound of the formula

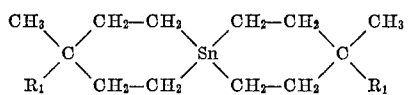

wherein $R_1$ is a $C_1$ to $C_4$ alkyl radical, which process comprises: reacting a tin tetrahalide selected from the group consisting of tin tetrachloride and tin tetrabromide with an organo aluminum compound in a ratio of Al to Sn of about 1.5:1 to 3:1, said organo aluminum compound being obtained by reaction of a diolefine of the formula

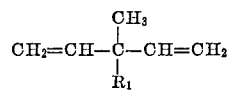

wherein $R_1$ represents an alkyl radical of 1 to 4 carbon atoms with an aluminum compound of the formula

wherein $y$ represents an alkyl radical of 2 to 4 carbon atoms and $y_1$ represents a member selected from the group cosisting of hydrogen and an alkyl radical of 1 to 4 carbon atoms in a ratio of 0.5 to 4 moles of said diolefin to one mole of said aluminum compound and at a temperature of from 20° C. to 160° C.

References Cited in the file of this patent
UNITED STATES PATENTS 3,014,941    Walsh _____ Dec. 26, 1961

FOREIGN PATENTS 1,214,013    France _____ Nov. 2, 1959

OTHER REFERENCES

Ingram et al.: "Chem. Rev." 60, No. 5, pages 478, 479 and 526–539 (October 1960).